US012749789B2

(12) United States Patent
Xiong

(10) Patent No.: US 12,749,789 B2
(45) Date of Patent: Sep. 29, 2026

(54) ELECTRONIC DEVICE INCLUDING A RESONATOR ELECTRICALLY CONNECTED TO A GROUND PLATE THROUGH A CONNECTOR AND A TUNING MEMBER FOR TUNING OUT SPURIOUS WAVES

(71) Applicant: VIVO MOBILE COMMUNICATION CO., LTD., Guangdong (CN)

(72) Inventor: Peng Xiong, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 197 days.

(21) Appl. No.: 18/672,066

(22) Filed: May 23, 2024

(65) Prior Publication Data

US 2024/0313390 A1 Sep. 19, 2024

Related U.S. Application Data

(63) Continuation of application No. PCT/CN2022/132271, filed on Nov. 16, 2022.

(30) Foreign Application Priority Data

Nov. 23, 2021 (CN) ......................... 202111397168.7

(51) Int. Cl.

*H01P 7/00* (2006.01)
*H01P 1/20* (2006.01)
*H01Q 1/24* (2006.01)
*H01Q 1/50* (2006.01)
*H01Q 1/52* (2006.01)
*H01Q 3/22* (2006.01)

(52) U.S. Cl.

CPC .................. *H01P 7/00* (2013.01); *H01P 1/20* (2013.01); *H01Q 1/243* (2013.01); *H01Q 1/50* (2013.01); *H01Q 1/52* (2013.01); *H01Q 3/22* (2013.01)

(58) Field of Classification Search

CPC .... H01P 7/00; H01P 7/088; H01P 7/10; H01P 1/20
USPC .......................................................... 333/235
See application file for complete search history.

(56) References Cited

U.S. PATENT DOCUMENTS 4,249,179 A 2/1981 Kolacny
4,630,012 A * 12/1986 Fuller et al. .............. H01P 7/10 333/219.1
5,612,655 A * 3/1997 Stronks et al. ........... H01P 7/10 333/219.1
7,564,412 B2 7/2009 Walker et al.
(Continued)

FOREIGN PATENT DOCUMENTS

CN 108011599 A 5/2018
CN 209860147 U 12/2019
(Continued)

*Primary Examiner* — Benny T Lee
(74) *Attorney, Agent, or Firm* — Price Heneveld LLP

(57) ABSTRACT

This application discloses an electronic device applied to the field of electronic technologies. The electronic device includes a resonator, a connector, a tuning member, and a ground plate. The resonator is electrically connected to the ground plate via the connector and the tuning member in sequence, and the tuning member is configured to adjust a band of a spurious wave generated by the resonator to be outside an operating band of an antenna of the electronic device.

10 Claims, 2 Drawing Sheets

(56) References Cited

U.S. PATENT DOCUMENTS

| | | | |
|---|---|---|---|
| 10,665,937 | B2 | 5/2020 | Islam et al. |
| 2020/0321925 | A1 | 10/2020 | Zhou et al. |

FOREIGN PATENT DOCUMENTS

| | | | |
|---|---|---|---|
| CN | 114094333 | A | 2/2022 |
| EP | 1583173 | B1 | 4/2008 |
| EP | 3859886 | A1 | 8/2021 |
| WO | 2017068885 | A1 | 4/2017 |

* cited by examiner

ELECTRONIC DEVICE INCLUDING A RESONATOR ELECTRICALLY CONNECTED TO A GROUND PLATE THROUGH A CONNECTOR AND A TUNING MEMBER FOR TUNING OUT SPURIOUS WAVES

CROSS-REFERENCE TO RELATED APPLICATIONS

This application is a Bypass Continuation Application of PCT International Application No. PCT/CN2022/132271 filed on Nov. 16, 2022, which claims priority to Chinese Patent Application No. 202111397168.7, filed in China on Nov. 23, 2021, which are incorporated herein by reference in their entireties.

TECHNICAL FIELD

This application pertains to the field of electronic technologies, and specifically, relates to an electronic device.

BACKGROUND

With the development of electronic technologies, electronic devices have occupied an increasingly important position in life. In addition, people's requirements for these electronic devices are getting increasingly higher. An existing electronic device typically needs to support radiation of signals across multiple bands. However, many spurious-wave resonators are provided in the electronic device, and the spurious-wave resonators tend to radiate spurious waves. The bands of the spurious waves usually fall within the operating bands of the electronic device, leading to poor radiation performance of the electronic device.

SUMMARY OF THE INVENTION

An embodiment of this application provides an electronic device including a resonator, a connector, a tuning member, and a ground plate. The resonator is electrically connected to the ground plate via the connector and the tuning member in sequence, and the tuning member is configured to adjust a band of a spurious wave generated by the resonator to be outside an operating band of an antenna of the electronic device.

DETAILED DESCRIPTION OF THE EMBODIMENTS

The following description clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first" and "second" are typically used to distinguish between objects of a same type but do not limit quantities of the objects. For example, there may be one or more first objects. In addition, "and/or" in the specification and claims represents at least one of connected objects, and the character "/" generally indicates that the associated objects have an "or" relationship.

With reference to the accompanying drawings, an electronic device provided in the embodiments of this application are described below in detail by using specific embodiments and application scenarios thereof.

Figure 2:
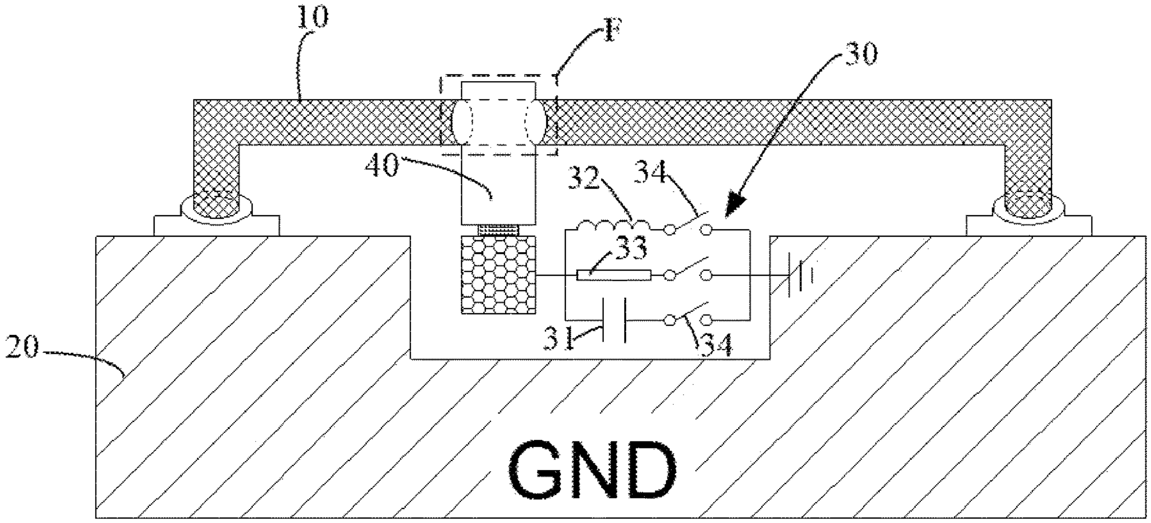
FIG. 2 is a schematic structural diagram of another electronic device according to an embodiment of this application.

Referring to FIG. 2, FIG. 2 is a schematic structural diagram of an electronic device according to an embodiment of this application. As shown in FIG. 2, the electronic device includes a resonator 10, a connector 40, a tuning member 30, and a ground plate 20. The resonator 10 is electrically connected to the ground plate 20 via the connector 40 and the tuning member 30 in sequence, and the tuning member 30 is configured to adjust a band of a spurious wave generated by the resonator 10 to be outside an operating band of an antenna of the electronic device.

The operation principles of this embodiment of this application can be found in the following expressions:

The resonator 10 is electrically connected to the ground (GND) plate 20 via the connector 40 and the tuning member 30 in sequence, meaning that the resonator 10 can be grounded via the connector 40 and the tuning member 30. The tuning member 30 can be configured to adjust the band of the spurious wave generated by the resonator 10 to be outside the operating band of the antenna of the electronic device, so as to achieve the effect of removing the spurious wave generated by the resonator 10 from the operating band of the electronic device, thus enhancing the radiation performance of the electronic device. In other words, the band of the spurious wave generated by the resonator 10 does not overlap with the operating band of the electronic device. In this way, the operating band of the electronic device is not interfered with by the spurious wave generated by the resonator 10, thus enhancing the radiation performance of the electronic device.

It should be noted that the operating band of the electronic device in this embodiment of this application may be understood as the operating band of the antenna disposed on the electronic device, and the radiation performance of the electronic device may also be understood as the radiation performance of the antenna.

It should be noted that the specific structure of the resonator 10 is not limited herein. In an optional embodiment, the resonator 10 includes at least one of a coaxial wire, a flexible circuit board, a metal cavity with an opening, a grounded metal connector, and a reinforcing member. The reinforcing member may be a reinforcing metal member or a reinforcing steel sheet.

The flexible circuit board may also be called a "flexible printed circuit" (FPC), the metal cavity with an opening may also be called "a half-closed metal chamber" or "a half-closed metal cavity", the grounded metal connector may also be called "a grounded metal structural member", and the reinforcing member may also be called "a reinforcing metal member" or "a reinforcing steel sheet".

In an embodiment of this application, the electronic device includes various types of resonators 10, which may include at least one of a coaxial wire, a flexible circuit board, a metal cavity with an opening, a grounded metal connector, and a reinforcing member. Therefore, each of the foregoing types of resonators 10 can be arranged according to the structure of the resonator 10 in the foregoing embodiment, reducing the impact of spurious waves generated by the various types of resonators 10 on the operating band of the antenna, thus further improving the radiation effect of the antenna.

To describe the embodiments of this application more clearly, the embodiments of this application are all described by using the resonator 10 including a coaxial wire as an example. In addition, the content in the embodiments of this application is provided merely for a clearer description of the solution in the embodiments of this application and does not constitute specific limitations on the embodiments of this application. For other types of resonators 10, reference may be made to the structure arrangement of the coaxial wire in the embodiments of this application, and details are not described herein.

In a case that the resonator 10 includes a coaxial wire, the coaxial wire may include a housing, a transmission line, and a metal grounding layer. The housing may be an insulating housing, the transmission line may extend into the housing, the metal grounding layer may be sleeved on an outer wall of the housing, and the metal grounding layer is configured for grounding. The transmission line is insulated from the metal grounding layer. To be specific, the transmission line may be insulated from the metal grounding layer via the housing. The transmission line can be configured to transmit a signal.

In an optional embodiment, in a case that the resonator 10 includes the coaxial wire, the coaxial wire is partially apart from the ground plate 20, and the metal grounding layer of the coaxial wire is electrically connected to the ground plate 20 via the connector 40 and the tuning member 30 in sequence. In this way, since the metal grounding layer of the coaxial wire is electrically connected to the ground plate 20 via the connector 40 and the tuning member 30 in sequence, normal implementation of functions of the transmission line of the coaxial wire is not affected. In addition, the metal grounding layer is grounded, allowing for removal of the spurious wave generated by the resonator 10 from the operating band of the antenna of the electronic device, thus enhancing the radiation performance of the antenna of the electronic device.

In a case that the resonator 10 is used to connect the antenna of the electronic device to a radio frequency unit, the transmission line can be used to transmit a feed signal sent by the radio frequency unit to the antenna.

In addition, in a case that the resonator 10 includes the coaxial wire, the metal grounding layer of the coaxial wire can be grounded directly, and the metal grounding layer of the coaxial wire can be electrically connected to the ground plate 20 via the connector 40 and the tuning member 30, that is, the metal grounding layer of the coaxial wire can be grounded via the connector 40 and the tuning member 30. In this way, the structure of the coaxial wire does not need to be changed, that is, the physical size of the coaxial wire is not changed, and therefore the normal implementation of functions of the coaxial wire is not affected, thus allowing for a good grounding effect of the coaxial wire.

The ground plate 20 may refer to a component of the electronic device such as a main board or a frame, and a grounding point may be provided on the ground plate 20.

It should be noted that the specific structure of the tuning member 30 is not limited herein. In an optional embodiment, referring to FIG. 2, the tuning member 30 includes at least one of a capacitor 31 and an inductor 32. In other words, the tuning member 30 may include only the capacitor 31 or the inductor 32. Certainly, the tuning member 30 may alternatively include both the capacitor 31 and the inductor 32. In a case that the tuning member 30 includes both the capacitor 31 and the inductor 32, the capacitor 31 and the inductor 32 may be combined to form an LC filter circuit. Certainly, the capacitor 31 and the inductor 32 may be alternatively connected to each other in parallel. The specific manner is not limited herein.

In a case that the tuning member 30 includes the inductor 32 and the resonator 10 is connected to the inductor 32, a detuning effect can be achieved, enabling the frequency of the spurious wave generated by the resonator 10 to shift towards a higher frequency. In a case that the tuning member 30 includes the capacitor 31 and the resonator 10 is connected to the capacitor 31, a tuning effect can be achieved, enabling the frequency of the spurious wave generated by the resonator 10 to shift towards a lower frequency.

In this embodiment of this application, the type of the tuning member 30 can be selected based on the frequency of the spurious wave generated by the resonator 10. For example, in a case that the frequency of the spurious wave generated by the resonator 10 overlaps with the operating band of the antenna in a high-band, the tuning member 30 may use the inductor 32, such that the frequency of the spurious wave generated by the resonator 10 shifts towards a higher frequency to deviate from the operating band of the antenna. Similarly, when the frequency of the spurious wave generated by the resonator 10 overlaps with the operating band of the antenna in a low-band, the tuning member 30 may use the capacitor 31, such that the frequency of the spurious wave of the resonator 10 shifts towards a lower frequency to deviate from the operating band of the antenna. This allows for greater flexibility and diversity in the types of the tuning member 30, and also enhances the radiation performance of the antenna.

In addition to the capacitor 31 and the inductor 32, the tuning member 30 may further include another component which may be a resistor 33 or the like. It should be noted that the resistance value of the resistor 33 is not limited herein. For example, the resistance value of the resistor 33 may be 0 ohm. In this case, the third branch is equivalent to a wire, that is, the resonator 10 may be grounded directly. In this way, the purpose of adjusting the band of the spurious wave generated by the resonator 10 to be outside the operating band of the electronic device can also be achieved.

In an optional embodiment, referring to FIG. 2, the tuning member 30 includes the capacitor 31, the inductor 32, and the resistor 33. The capacitor 31 is located in a first branch, the inductor 32 is located in a second branch, the resistor 33 is located in a third branch, and the first branch, the second branch, and the third branch are connected in parallel.

In an embodiment of this application, the tuning member 30 may include a circuit in which the first branch, the second branch, and the third branch are connected in parallel, and the capacitor 31 is located in the first branch, the inductor 32 is located in the second branch, and the resistor 33 is located in the third branch. In this way, the capacitor 31, the inductor 32, and the resistor 33 are connected in parallel, which can further enhance the diversity of the tuning member 30. In addition, in the case of adjusting the frequency of the spurious wave generated by the resonator 10, the tuning member 30 has the adjustment features of the capacitor 31, the inductor 32, and the resistor 33, thus further enhancing the adjustment effect on the radiation performance of the antenna.

It should be noted that when the tuning member 30 uses at least one of the capacitor 31, the inductor 32, and the resistor 33, because the parameters of the capacitor 31, the inductor 32, and the resistor 33 have been determined, the adjustment effect on the frequency of the spurious wave generated by the resonator 10 has also been determined. To achieve more flexible adjustment effect on the frequency of the spurious wave generated by the resonator 10, the resonator 10 can be flexibly controlled to be connected to at least one of the capacitor 31, the inductor 32, and the resistor 33.

In an optional embodiment, referring to FIG. 2, the first branch, the second branch, and the third branch are each provided with a first control switch 34. At least some of the first control switch 34 in the first branch, the first control switch 34 in the second branch, and the first control switch 34 in the third branch can be closed, and certainly, at least some of the first control switch 34 in the first branch, the first control switch 34 in the second branch, and the first control switch 34 in the third branch can be opened. In other words, the states of the first control switch 34 in the first branch, the first control switch 34 in the second branch, and the first control switch 34 in the third branch can be changed flexibly. In this way, through flexible control of the states of the first control switches 34 in the first branch, the second branch, and the third branch, the capacitor 31, the inductor 32, and the resistor 33 can be flexibly controlled to be connected to the resonator 10, thus achieving more flexible adjustment effect on the frequency of the spurious wave generated by the resonator 10.

In another optional embodiment, the tuning member 30 further includes a second control switch, and the second control switch is configured to control at least one of the first branch, the second branch, and the third branch to be connected to the resonator 10. In this way, controlling, via the second control switch, to control at least one of the first branch, the second branch, and the third branch to be connected to the resonator 10 can also flexibly control the capacitor 31, the inductor 32, and the resistor 33 to be connected to the resonator 10, thus achieving more flexible adjustment effect on the frequency of the spurious wave generated by the resonator 10.

It should be noted that the state of the first control switch or the second control switch can be determined based on the band of the spurious wave generated by the resonator 10.

Figure 1:
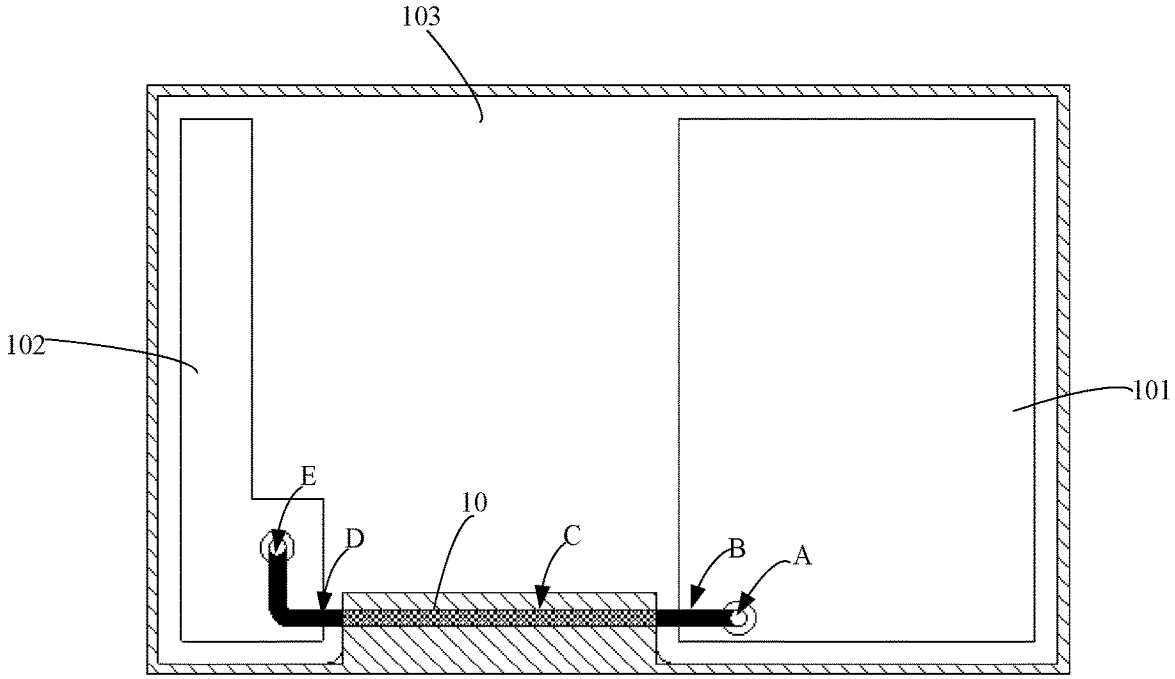
FIG. 1 is a schematic structural diagram of an electronic device according to an embodiment of this application.

Referring to FIG. 1, the electronic device includes a first main board 101, a second main board 102, and a metal board 103. The first main board 101 may also be called "a primary board", and the second main board 102 may also be called "a secondary board". A radio frequency unit may be provided on the first main board 101, an antenna may be provided on the second main board 102, and the resonator 10 may be connected to both the radio frequency unit and the antenna, allowing the radio frequency unit to feed the antenna. In addition, the resonator 10 may be divided into regions A, B, C, D and E in sequence. Region A refers to a region in which one terminal of the resonator 10 is snap-fitted with the first main board 101, region E refers to a region in which another terminal of the resonator 10 is snap-fitted with the second main board 102, region B may be called a spare region of the resonator 10 close to the first main board 101, region D may be called a spare region of the resonator 10 close to the second main board 102, and region C may be a region in which the resonator 10 is embedded in a wire groove of the metal board 103.

It should be noted that region A and region E are provided to facilitate mounting of the resonator 10 and region A and region E are necessary regions. Therefore, the resonator 10 cannot be completely attached to the first main board 101 and the second main board 102. To be specific, a gap is present between the resonator 10 and the first main board 101 in region A and between the resonator 10 and the second main board 102 in region E. In addition, the resonator 10 is configured to transmit a radiation signal sent by the radio frequency unit to the antenna. Thus, the resonator 10 is likely to form a gap antenna in region A and region E, thus generating spurious waves. In addition, the band of the spurious waves may fall into the operating band of the electronic device, thus reducing the radiation performance of the electronic device.

Therefore, to resolve the foregoing problems, the technical solution of the embodiments of this application is provided. For details, reference may be made to specific descriptions in the foregoing embodiments.

In addition, due to the strong current and weak electric field in region A and region E and the strong electric field and weak current in the regions between region A and region E, to further reduce the influence of the resonator 10 on the radiation performance of the electronic device, the resonator 10 may be electrically connected to the ground plate 20 at a position with a strong electric field.

In an optional embodiment, the resonator 10 includes a first end portion, a connection point, and a second end portion. The connection point is located between the first end portion and the second end portion, and the connection point is electrically connected to the ground plate 20 via the connector 40 and the tuning member 30 in sequence.

The first end portion and the second end portion may be both connected to the ground plate 20. In this case, because the connection point is located between the first end portion and the second end portion, it can be electrically connected to the ground plate 20 via the connector 40 and the tuning member 30 at a point with a strong electric field, thus further reducing the influence of the resonator 10 on the radiation performance of the electronic device and enhancing the radiation performance of the electronic device.

In an optional embodiment, the connection point is located at a middle position between the first end portion and the second end portion. In this way, because the electric field at the middle position of the resonator 10 is usually the strongest, the connection point is located at the middle position of the resonator 10 (that is, the middle position between the first end portion and the second end portion), which further reduces the influence of the resonator 10 on the radiation performance of the electronic device, enhancing the radiation performance of the electronic device.

Figure 3:
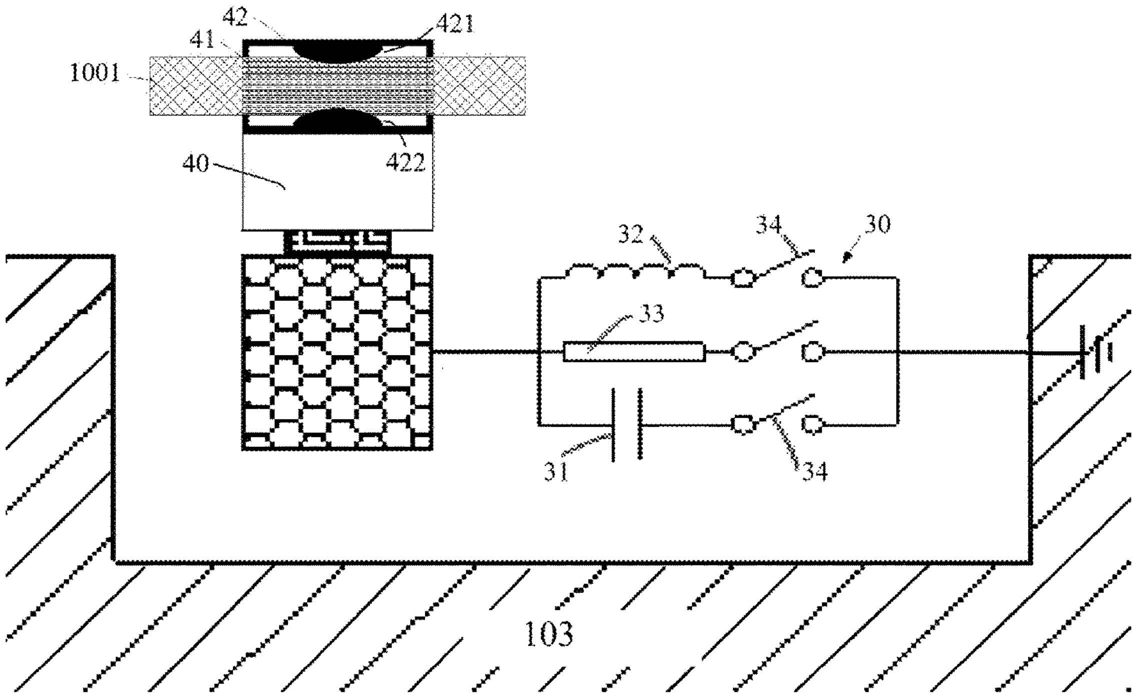
FIG. 3 is a schematic diagram of a cross section of region F in FIG. 2 according to an embodiment of this application.

In an optional embodiment, referring to FIG. 3, the connector 40 includes a first grounding ring 41 and a metal clamp 42. Using the coaxial wire 1001 as an example, the first grounding ring 41 is sleeved on the metal grounding layer of the coaxial wire 1001, an inner wall of the first grounding ring 41 abuts against the metal grounding layer, the metal clamp 42 abuts against an outer wall of the first grounding ring 41, and the metal clamp 42 is electrically connected to the tuning member 30.

In this embodiment of this application, the metal grounding layer of the coaxial wire 1001 is typically a mesh-woven metal wire or a semi-rigid metal tube. The first grounding ring 41 is sleeved on the outer wall of the coaxial wire 1001 and the inner wall of the first grounding ring 41 abuts against the metal grounding layer, thus enhancing the effect of electrical connection between the inner wall of the first grounding ring 41 and the metal grounding layer. In addition, the metal clamp 42 abuts against the outer wall of the first grounding ring 41 and the metal clamp 42 is electrically connected to the tuning member 30. In this way, under the action of the metal clamp 42, the effect of electrical connection between the inner wall of the first grounding ring 41 and the metal grounding layer can be further enhanced. Moreover, the metal clamp 42 can also clamp the coaxial wire 1001 to enhance the rigidity of the coaxial wire 1001, thus alleviating the phenomenon that a portion of the coaxial wire 1001 abuts against the metal board 103 while another portion has a gap with the metal board 103 due to the low rigidity of the coaxial wire 1001.

In an optional embodiment, referring to FIG. 3, a first protrusion 421 and a second protrusion 422 are disposed on two opposite inner walls of the metal clamp 42, and the outer wall of first grounding ring 41 abuts against both the first protrusion 421 and the second protrusion 422. In this way, since the outer wall of the first grounding ring 41 abuts against both the first protrusion 421 and the second protrusion 422, that is, the first grounding ring 41 can be disposed in a gap between the first protrusion 421 and the second protrusion 422, with the outer wall of the first grounding ring 41 abutting against the first protrusion 421 and the second protrusion 422, so that the first grounding ring 41 is snap-fitted with the metal clamp 42, thus enhancing the effect of electrical connection between the metal clamp 42 and the first grounding ring 41.

It should be noted that the shapes of the first protrusion 421 and the second protrusion 422 are not limited herein. For example, cross sections of the first protrusion 421 and the second protrusion 422 may be rectangular or arc-shaped. When the cross sections of the first protrusion 421 and the second protrusion 422 are arc-shaped, the damage caused by the first protrusion 421 and the second protrusion 422 to the outer wall of the first grounding ring 41 can be reduced.

In another optional embodiment, the inner wall of the metal clamp 42 has an interference fit with the outer wall of the first grounding ring 41, which can also enhance the effect of electrical connection between the metal clamp 42 and the first grounding ring 41.

Figure 4:
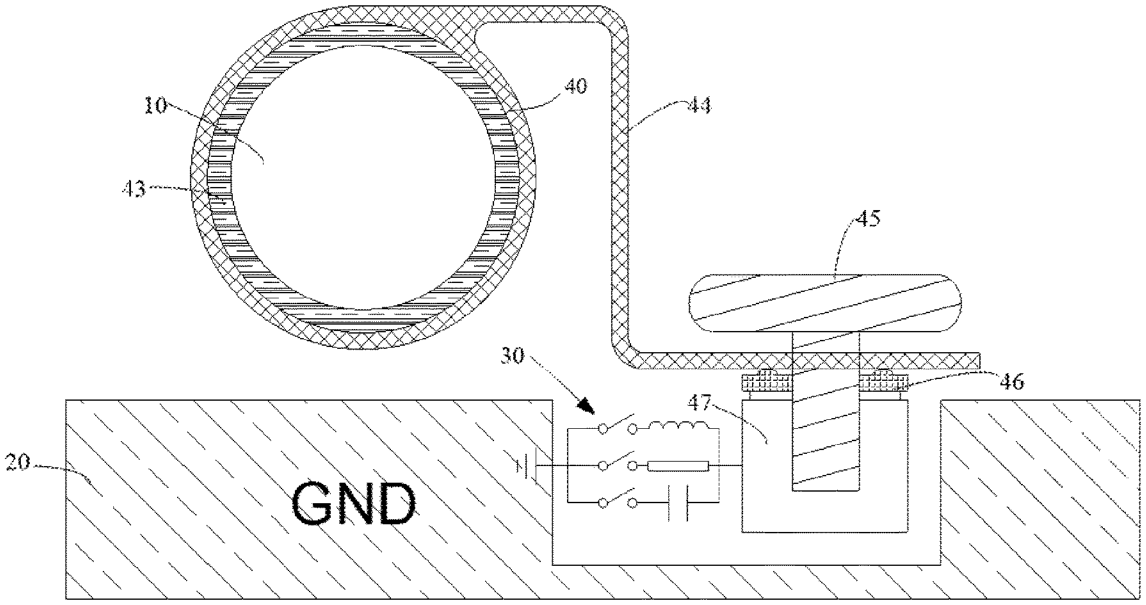
FIG. 4 is a schematic structural diagram of another electronic device according to an embodiment of this application.

In another optional embodiment, referring to FIG. 4, the connector 40 includes a second grounding ring 43 and a flexible conductive connector 44. The second grounding ring 43 is sleeved on the resonator 10, an inner wall of the second grounding ring 43 abuts against the resonator 10, one terminal of the flexible conductive connector 44 is electrically connected to an outer wall of the second grounding ring 43, and another terminal of the flexible conductive connector 44 is electrically connected to the tuning member 30.

The flexible conductive connector 44 may also be called "a flexible circuit board", and the flexible conductive connector 44 has a good foldable performance.

In this embodiment, when a position where the resonator 10 is located allows for a small mounting space (that is, the mounting space at the position where the resonator 10 is located is quite narrow), the second grounding ring 43 can be sleeved on the resonator 10 and the second grounding ring 43 is electrically connected to the tuning member 30 via the flexible conductive connector 44, thus ensuring a good grounding effect of the resonator 10 by utilizing the good foldable performance of the flexible conductive connector 44.

In an optional embodiment, referring to FIG. 4, the connector 40 further includes a locking screw 45 and a metal gasket 46. The locking screw 45 is pressed against a first surface of the flexible conductive connector 44, and a second surface of the flexible conductive connector 44 is electrically connected to the tuning member 30 via the metal gasket 46. In this way, the pressing effect of the locking screw 45 can ensure a good effect of electrical connection between the flexible conductive connector 44 and the tuning member 30.

It should be noted that to further enhance the effect of connection between the metal gasket 46 and the second surface of the flexible conductive connector 44, multiple protrusions may also be disposed on the surface of the metal gasket 46 facing the second surface. Certainly, multiple protrusions may also be disposed on the surface of the metal gasket 46 facing the tuning member 30.

It should be noted that GND in FIGS. 2 and 4 represents a grounding point or a wire grounding end.

In addition, referring to FIG. 4, the connector 40 may further include a metal sheet 47, and the metal gasket 46 and the locking screw 45 can both be electrically connected to the tuning member 30 via the metal sheet 47, which can further enhance the effect of electrical connection between the flexible conductive connector 44 and the tuning member 30.

It should be noted that the metal sheet 47 in this embodiment of this application may further be applied to the foregoing various embodiments, that is, to the connection method between the connector 40 and the tuning member 30.

It should be noted that the metal sheet 47 may be a separate region provided for the ground plate 20, and the metal sheet 47 is not electrically connected to the grounding point on the ground plate 20, that is, the metal sheet 47 may be insulated from the grounding point.

In an optional embodiment, the metal sheet 47 may be applied to the target region on the ground plate 20, and the target region may be insulated from the grounding point, which allows the metal sheet 47 to be insulated from the grounding point on the ground plate 20. In addition, optionally, the foregoing target region may be an insulated region.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. An electronic device, comprising a resonator, a connector, a tuning member, and a ground plate, wherein the resonator is electrically connected to the ground plate via the connector and the tuning member in sequence, and the tuning member is configured to adjust a band of a spurious wave generated by the resonator to be outside an operating band of an antenna of the electronic device; wherein the tuning member comprises at least one of a capacitor and an inductor.

2. The electronic device according to claim 1, wherein in a case that the resonator comprises a coaxial wire, the coaxial wire is partially spaced apart from the ground plate, and a metal grounding layer of the coaxial wire is electrically connected to the ground plate via the connector and the tuning member in sequence.

3. The electronic device according to claim 1, wherein the tuning member comprises the capacitor, the inductor, and a resistor, wherein the capacitor is located in a first branch, the inductor is located in a second branch, the resistor is located in a third branch, and the first branch, the second branch, and the third branch are connected in parallel.

4. The electronic device according to claim 3, wherein the first branch, the second branch, and the third branch are each provided with a respective first control switch.

5. The electronic device according to claim 1, wherein the resonator comprises a first end portion, a connection point, and a second end portion, wherein the connection point is located between the first end portion and the second end portion, and the connection point is electrically connected to the ground plate via the connector and the tuning member in sequence.

6. The electronic device according to claim 5, wherein the connection point is located at a middle position between the first end portion and the second end portion.

7. The electronic device according to claim 1, wherein the resonator comprises a coaxial wire, the connector comprises a first grounding ring and a metal clamp, wherein the first grounding ring is sleeved on a metal grounding layer of the coaxial wire, an inner wall of the first grounding ring abuts against the metal grounding layer, the metal clamp abuts against an outer wall of the first grounding ring, and the metal clamp is electrically connected to the tuning member.

8. The electronic device according to claim 7, wherein a first protrusion and a second protrusion are disposed on two opposite inner walls of the metal clamp, and the outer wall of first grounding ring abuts against both the first protrusion and the second protrusion.

9. The electronic device according to claim 1, wherein the connector comprises a second grounding ring and a flexible conductive connector, wherein the second grounding ring is sleeved on the resonator, an inner wall of the second grounding ring abuts against the resonator, one terminal of the flexible conductive connector is electrically connected to an outer wall of the second grounding ring, and another terminal of the flexible conductive connector is electrically connected to the tuning member.

10. The electronic device according to claim 9, wherein the connector further comprises a locking screw and a metal gasket, wherein the locking screw is pressed against a first surface of the flexible conductive connector, and a second surface of the flexible conductive connector is electrically connected to the tuning member via the metal gasket.

* * * * *